July 31, 1923.
W. D. HENRY
TOWING TONGUE
Filed Feb. 25, 1922
1,463,699
2 Sheets-Sheet 1
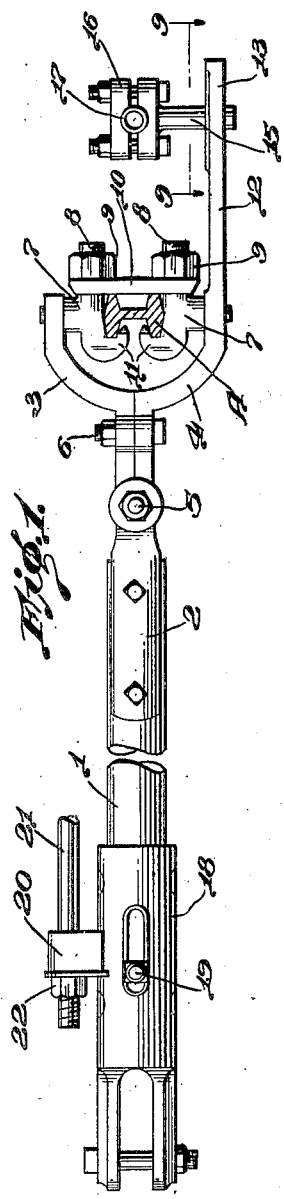
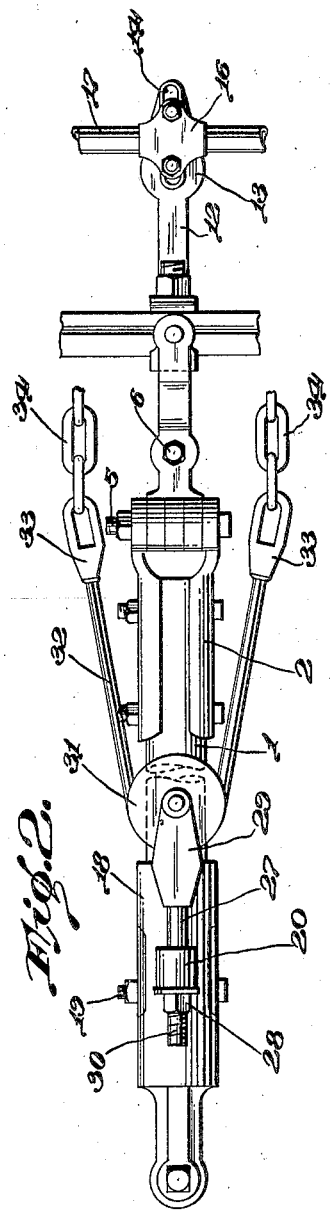
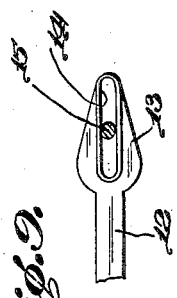
William D. Henry
INVENTOR
BY Victor J. Evans
ATTORNEY

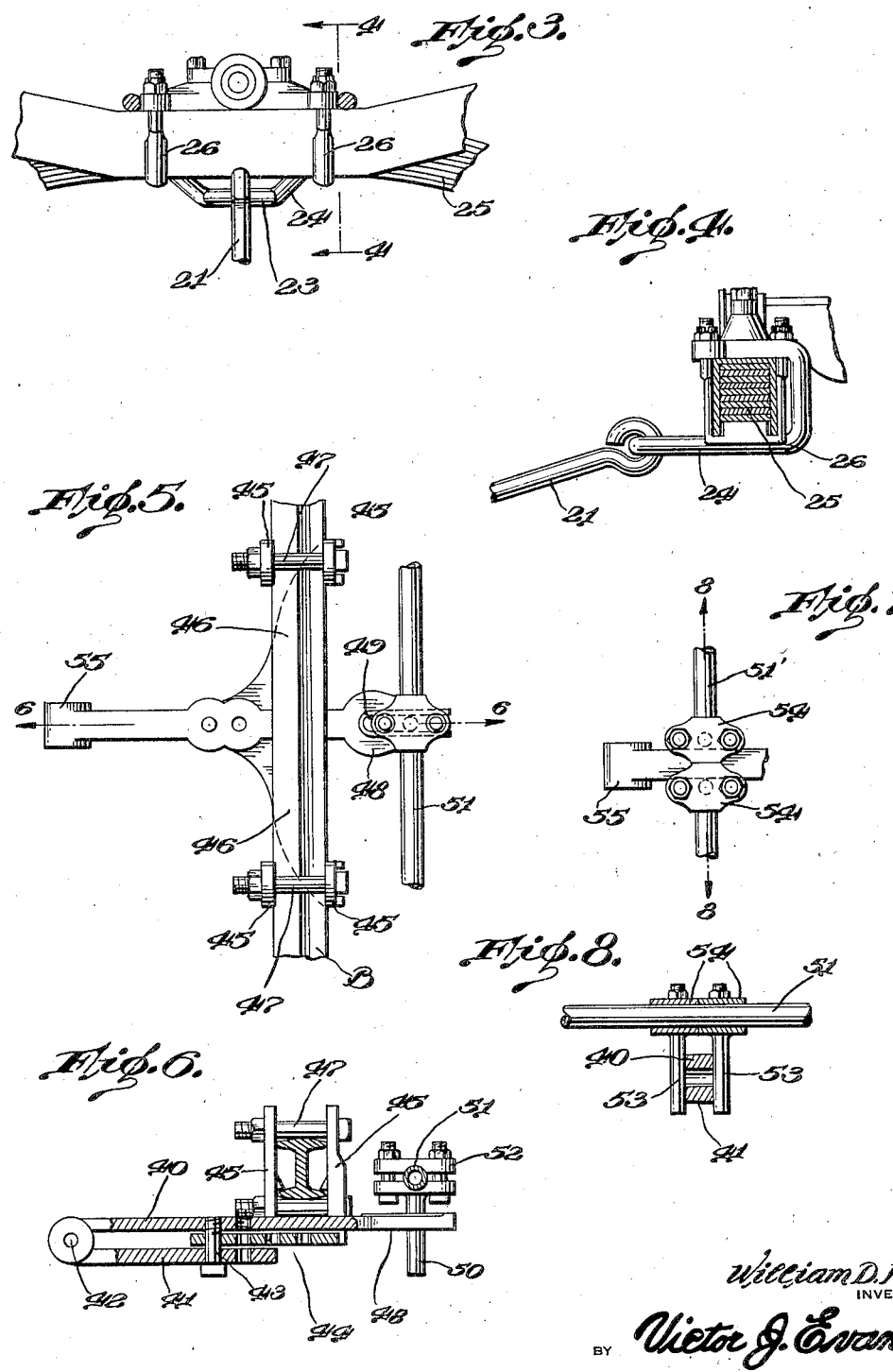

Patented July 31, 1923.

1,463,699

UNITED STATES PATENT OFFICE.

WILLIAM D. HENRY, OF GREENVILLE, ILLINOIS.

TOWING TONGUE.

Application filed February 25, 1922. Serial No. 539,175.

*To all whom it may concern:*

Be it known that I, WILLIAM D. HENRY, a citizen of the United States, residing at Greenville, in the county of Bond and State of Illinois, have invented new and useful Improvements in Towing Tongues, of which the following is a specification.

This invention relates to a towing tongue for automobiles, trailers, trucks or analogous vehicles, and an object of the invention is to provide a towing tongue which may be utilized for towing automobiles, trucks, or analogous vehicles with bent radius rods, axles or similar broken parts, which will eliminate the undesirable features such as jerking, the breaking of ropes, chains, or cables and avoid accidents which might be encountered in crowded thoroughfares, going upon inclines on dusty roads or after dark such as are contingent with various devices now in use for towing disabled vehicles.

Another object of this invention is to provide a towing tongue as specified which can be easily attached to and removed from connection with a disabled vehicle and which pulls from the frame of the vehicle avoiding heavy strains on the center of the axle, and further to provide a towing tongue which will result in considerable saving of time, and one which is designed so as to provide a complete tool or equipment designed for towing attachment to all approved types of motor vehicles.

A further object of this invention is to provide a towing tongue as specified which includes an axle clamping structure designed to permit its attachment in an upright or reversed manner to the axle of a vehicle adapting it for attachment to vehicles to permit radius adjustment in cases where the spindle connecting rod is bent or where the construction of the vehicle requires such positioning of the device, also one which is adapted to permit proper adjustment to the spindle connecting rod where it is positioned in front of the axle.

Another object of the invention is to provide means for holding the axle clamped parallel with the steering cross rod while being tightened, and also a towing tongue structure designed to adapt itself for use with types of motor vehicles which have a splash pan or apron above and in front of the front axle, the said towing tongue having its working parts located beneath the front axle, and one which embodies a comparatively great number of adjustments permitting forward or rearward adjustment of the steering connection thereof.

Other objects of the invention will appear in the following detailed description taken in connection with the accompanying drawings wherein:

Fig. 1 is a side elevation of the improved towing tongue showing it applied and using a draw rod in connection therewith.

Fig. 2 is a top plan of the towing tongue showing the use of a cable and chain hitch in lieu of the draw rod construction.

Fig. 3 is a front view illustrating a fragment of front spring, housing and engine support, and showing the engaging hook used in connection with the draw rod.

Fig. 4 is an end view of Fig. 3 illustrating the connecting hook thereon.

Fig. 5 is a top plan of a modified form of the towing tongue.

Fig. 6 is a longitudinal section taken on the line 6—6 of Fig. 5.

Fig. 7 is a fragmentary detail illustrating the manner of connecting the improved form of towing tongue to the radius rod in front of the axle.

Fig. 8 is a section taken on the line 8—8 of Fig. 7.

Fig. 9 is a detail horizontal view taken on the line 9—9 of Fig. 1.

Referring more particularly to the drawings, the improved towing tongue comprises a pole 1 which has a socket 2 connected thereto to which socket arms 3 and 4 are connected by means of a bolt 5. The arms 3 and 4 are in turn connected by a bolt 6 and it has an axle clamping member 7 carried thereby. Threaded studs 8 are formed upon the axle clamps 7 and receive nuts 9 for engagement with the plate 10 and cooperation with the jaws 11 for secure clamping engagement with a vehicle axle as shown at A. The arm 4 has an extension 12 formed thereon which has an enlarged head 13 on its outer free end slotted as shown at 14 for receiving and engaging the shift pin 15 which shift pin is connected by means of a suitable clamp structure 16 to the cross rod 17 of the steering mechanism of a motor vehicle for steering the vehicle by the towing tongue structure, thereby eliminating the need of an operator in the vehicle being towed.

The pole 1 has a clevis 18 attached to its end remote from the socket 2 and adjustably connected to the pole by means of a transversely extending bolt 19. The clevis 18 is adapted for connection with a vehicle used for towing a second or disabled vehicle.

The above described mechanisms are similar to the analogous structures described in my companion applications filed February 5, 1921, Serial No. 442,742, and June 3, 1921, Serial No. 474,831.

The clevis 18 has a boss 20 formed thereon to which a draw rod 21 is connected, the improved draw rod being adjustable relative to the boss by adjustment of the nut 22 on its threaded end. The draw rod 21 has its end remote from the clevis 18 connected to the bight portion 3 of an auxiliary hook 24 which is adapted to engage about the spring structure 25 of a vehicle equipped with the improved towing tongue structure. The auxiliary hook 24 is securely held to and on the spring housing by means of the draw rod 21 when tongue is in working position as clearly shown in Figs. 3 and 4 of the drawings.

In Fig. 2 of the drawings, a flexible connection is provided in lieu of the draw rod structure 21, and when the flexible connection is utilized in connection with the improved towing tongue structure the draw rod 21 is disconnected from the boss 20 and a relatively short rod 27 is connected thereto, being adjustable relative to the boss by the nut 28. The rod 27 carries a yoke 29 on its end remote from its threaded end 30, which yoke rotatably supports a sheave 31. The cable 32 passes about the sheave 31 and has coupling links 33 on its free ends to which link chains 34 are connected. The said chains are adapted to be wrapped about the spring or axle structure to permit auxiliary connection with a vehicle to be towed and to adapt the towing tongue for use in connection with various types of vehicles with which the draw rod and auxiliary hook could not be employed. In supplying the improved towing tongue the structure may be applied with both a flexible connection and the draw rod providing a tool which is readily adaptable for attachment to motor vehicles of different makes or styles and one wherein the various parts of the towing tongue structure are positioned beneath the axle so as to prevent their interference with parts of the vehicle which might be located above the axle or in close proximity thereto.

In Figs. 5, 6, 7 and 8 of the drawings a modified form of the invention is shown which modified form is particularly adapted for use in connection with light or low tonnage trucks, the said modified form being adjustable and designed for quick and easy attachment to or disconnection from motor vehicles of modern design without making changes or alterations and in which the steering arrangement or construction is substantially the same steering capacity as the steering wheel of a vehicle.

In this modified form, the improved towing tongue comprises a flat bar 40 which has a second relatively short bar 41 pivotally connected thereto, by means of a bolt 42. The bars 40 and 41 are adjustably connected by means of a bolt 43 which extends through the bar 41, a plate 44 and threads into the plate 40 as clearly shown in Fig. 6 of the drawings. The plate 44 has upstanding axle engaging and clamping bars 45 carried thereby, and arranged in pairs at the ends of the transverse projection 46 on the plate, the said upstanding pairs of clamping bars being forced into clamping engagement with an axle B by means of the bolts 47. The bar 40 has a head 48 carried thereby which is provided with a longitudinally extending slot 49 for receiving the pin 50 which is connected to the steering cross rod 51 of the vehicle by a clamping structure 52. The clamping structure 52 is similar to the clamping structure 16 shown in Figs. 1 and 2 of the drawings and operates in a similar manner. In case the cross rod 51 is positioned in front of the axle B such construction being illustrated in Figs. 7 and 8 of the drawings, a novel form of clamp structure is provided to permit connection of the towing tongue to the cross rod, such clamp structure comprises rods 53 which have rod clamping heads 54 upon their upper ends, the said heads being adapted for tightly clamping across or about the rod 51' and for maintaining the rods 53 in engagement with the edges of the bars 40 and 41 to permit movement of the steering rod 51' with movement of the towing tongue.

It is to be understood, that by means of the head 55, the modified form of the towing tongue structure may be connected to the coupling 2 and to the pole 1 of the towing tongue structure.

It is, of course, to be understood that the invention may be constructed in other manners and the parts associated in other relations and, therefore, I do not desire to be limited in any manner except as set forth in the claims hereunto appended.

Having thus described my invention what I claim is:

1. In a towing tongue, a pole, a clevis adjustably connected to one end of said pole, axle engaging clamping means carried by the opposite end of said pole, a sheave pulley adjustably connected to said pole, and a flexible member extending about said pulley and adapted for connection with a vehicle to be towed.

2. In a towing tongue, a pole, a clevis adjustably connected to one end of said pole, axle engaging clamping means carried by the opposite end of said pole, a rod adjustably carried by said clevis, a sheave rotatably supported by said rod, and a flexible member passing about said sheave and adapted for connection with a vehicle to be towed.

3. In a towing tongue, a pole, a clevis adjustably connected to one end of said pole, axle engaging clamping means carried by the opposite end of said pole, a rod adjustably carried by said clevis, a sheave rotatably supported by said rod, a flexible member passing about said sheave and adapted for connection with a vehicle to be towed, and steering means adjustably connected to said axle engaging and clamping means.

In testimony whereof I affix my signature.

WILLIAM D. HENRY.